A. P. BRUSH.
CLUTCH.
APPLICATION FILED JUNE 1, 1914.
1,158,629.
Patented Nov. 2, 1915.
2 SHEETS—SHEET 1.
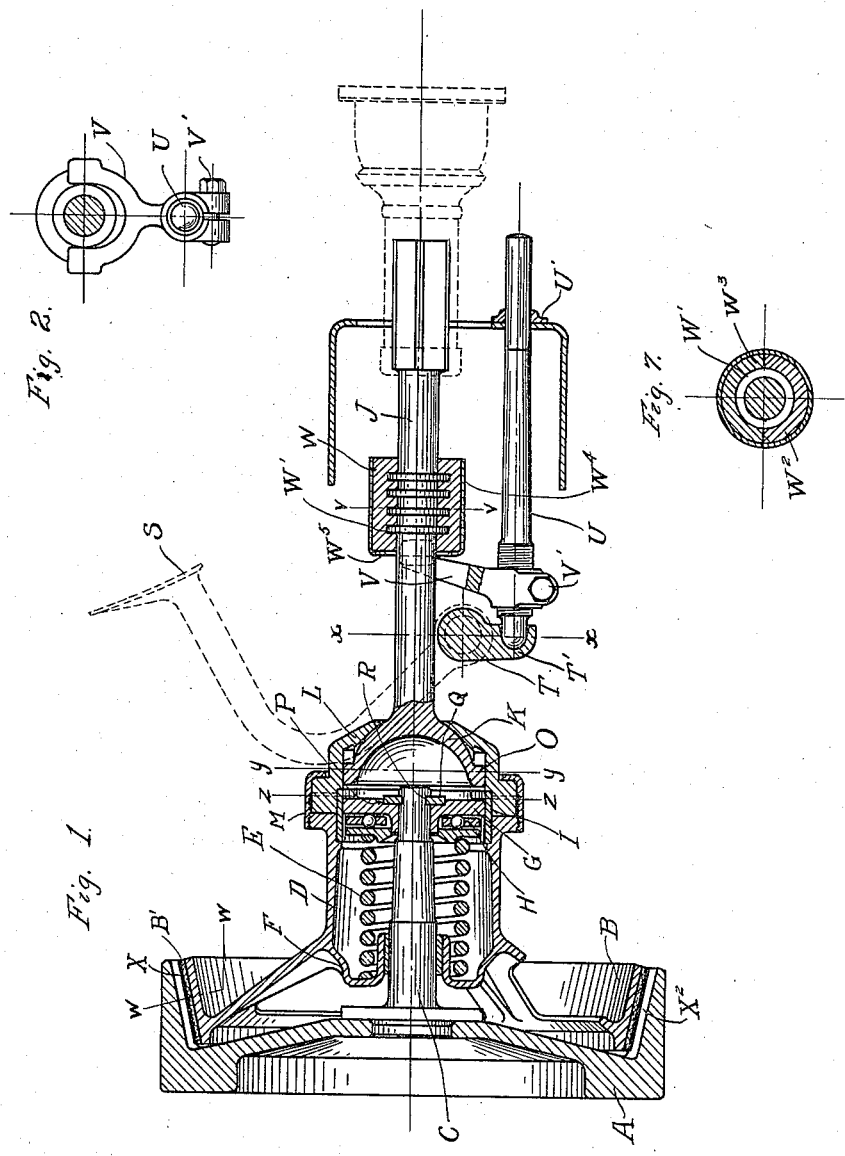
WITNESSES:
Dan J. Lewis.
James P. Barry
INVENTOR
Alanson P. Brush.
BY
Whittemore Hulbert & Whittemore
ATTORNEYS A. P. BRUSH.
CLUTCH.
APPLICATION FILED JUNE 1, 1914.
1,158,629.
Patented Nov. 2, 1915.
2 SHEETS—SHEET 2.
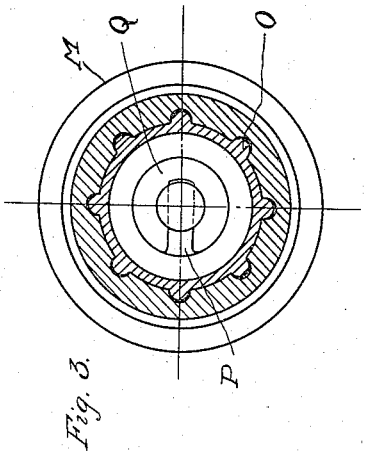
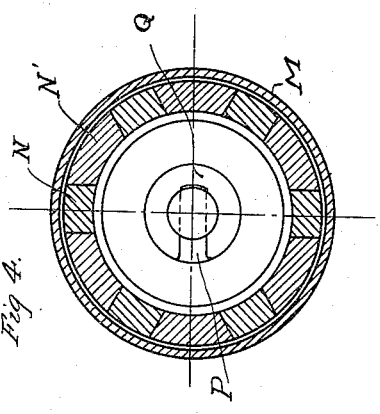
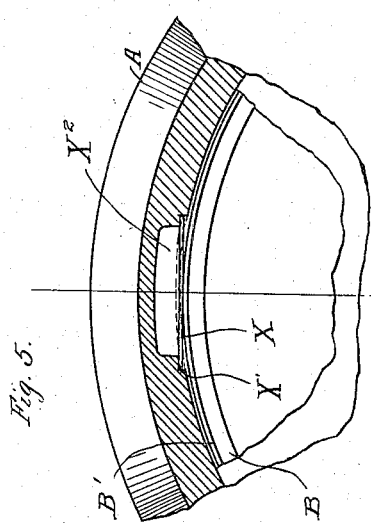
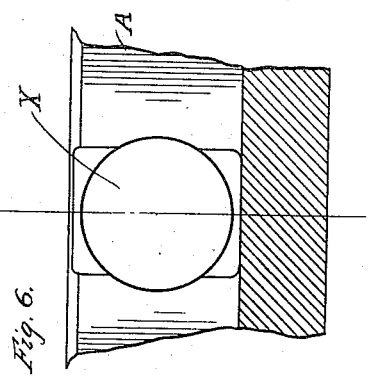
WITNESSES:
Dan J. Lewis.
James P. Barry.
INVENTOR
Alanson P. Brush.
BY
Whittemore, Hulbert & Whittemore
ATTORNEYS

UNITED STATES PATENT OFFICE.

ALANSON P. BRUSH, OF DETROIT, MICHIGAN.

CLUTCH.

1,158,629.   Specification of Letters Patent.   Patented Nov. 2, 1915.

Application filed June 1, 1914.   Serial No. 842,118.

*To all whom it may concern:*

Be it known that I, ALANSON P. BRUSH, a citizen of the United States of America, residing at Detroit, in the county of Wayne and State of Michigan, have invented certain new and useful Improvements in Clutches, of which the following is a specification, reference being had therein to the accompanying drawings.

The invention relates to clutches particularly designed for use upon motor vehicles and comprises various features of construction as hereinafter set forth.

In the drawings: Figure 1 is a longitudinal section through the clutch; Fig. 2 is a cross section substantially on line $x$—$x$ Fig. 1; Figs. 3 and 4 are cross sections respectively on line $y$—$y$ and $z$—$z$ Fig. 1; Fig. 5 is a section on line $w$—$w$, showing the means for breaking the adhesion of the clutch; Fig. 6 is a view at right angles to Fig. 5; and Fig. 7 is a cross section on line $v$—$v$ Fig. 1.

A and B are the coöperating members of a cone clutch, C is a spindle secured to and extending axially from the member A, and D is a hub for the member B which slidably engages the spindle C and forms a housing for the clutch-engaging spring E. The hub D is provided with an inwardly-extending flange F forming one bearing upon the spindle and also an abutment for the spring E.

G is a disk or collar secured to the outer end of the spindle, forming an opposite abutment for the spring and also a second bearing for the slidable hub.

H is an anti-friction ball thrust bearing arranged intermediate the collar G and the spring, and I is a bushing within the hub which forms a bearing for engaging the collar G.

For engaging and disengaging the clutch and also for transmitting the power, the member B is attached to a longitudinally-adjustable spline shaft J, which latter is connected with the power transmission shaft for connection with the drive axle. To provide for any lack of perfect alinement in the shafts, or for any movement which would throw them out of alinement, I have connected the shaft J to the hub D by a universal joint. This is preferably formed by a spherical portion K at the end of the shaft J, which engages a spherical socket cap L connected with the hub D. The cap is secured to the hub by a threaded sleeve M, and the torque is transmitted from one member to the other through intermeshing jaws N and N' formed thereon. For transmitting the torque from the cap L to the shaft J and at the same time providing for the limited universal, pivotal movement, the spherical portion K terminates in a toothed flange O which engages a complementary internally-toothed socket in the cap. Thus the rotary motion from the clutch will be transmitted through the hub D to the cap L and from the latter to the shaft J, and at the same time said shaft is free to have a limited lateral movement out of true axial alinement with the spindle C.

For securing the collar G upon the spindle C, the former is preferably provided with a recess P for receiving a circular key member Q. This member is transversely slotted to form parallel sides for embracing the spindle C and engaging slots R therein, and when once in engagement the tension of the spring E will hold the collar G against the key so as to retain the latter in the circular recess P. This will preclude any accidental displacement of the parts and at the same time will permit of readily detaching the same when necessary.

It is desirable that the housing for the spring and thrust bearing should be oil proof and to accomplish this purpose the bushing I has a shouldered engagement with the cap member and hub member D, so that when the threaded sleeve M is tightened a sealed joint is formed. Leakage of the oil from the cap is prevented by reason of the fact that the oil is held by centrifugal action adjacent to the periphery of the hub, while the opening in the cap through which the shaft passes is adjacent to the axis of the housing.

For releasing the clutch, a suitable operating lever is provided, such as the pedal S shown in dotted lines Fig. 1. This lever is connected with a rock-shaft T, which operates a fork embracing the shaft J and engaging a thrust bearing thereon. Inasmuch as the shaft J is laterally displaceable, I have provided an operating mechanism which will be unaffected by this movement. This comprises a rod U which is slidably engaged at one end with a suitable supporting bearing on the frame, as indicated at U', while the opposite end of this rod engages a recess in the end of a rock-arm T' on the rock-shaft T.

V is the fork which is mounted upon the rod U, preferably by a screw thread engagement, and projects therefrom so as to embrace the shaft J and to bear against a thrust collar W thereon. The fork V may be adjusted longitudinally upon the rod U by rotating the latter which will cause a travel upon a screw-threaded portion, while a clamping screw V' will serve to hold the fork from accidental adjustment. The thrust collar W is formed by a series of integral flanges W' on the shaft J, which engage segments $W^2$ and $W^3$, intermeshing therewith. The segments are held in engagement by an outer sleeve $W^4$ having an end portion $W^5$ against which the fork V bears. Thus, in addition to its function of an actuating member the fork V operates as a retainer to hold the sleeve $W^4$ in engagement with the segments $W^2$ and $W^3$.

It is usual to provide cone clutches with a facing of yieldable material such as leather, and it is also customary to provide means, such for instance as a spring, beneath the leather for softening the engagement of the clutch, this being commonly known as an easement. My improved clutch is provided with a novel construction of easement which is simple and inexpensive in construction and which does not produce a localized wearing of the leather facing, as is the case with many constructions heretofore used.

As shown in Figs. 5 and 6, X is a disk of resilient metal, which is engaged with a recess in the friction face of the member A, and when relieved from tension will extend as a chord of an arc of said friction face; or, in other words, the central portion of the disk will project inward beyond the circle of the friction face. This will cause the cone B which is provided with the friction facing B' to spring the central portion of the disk outward, as the clutch is engaged, thereby forming the easement or softening engagement. It also facilitates disengagement of the clutch by breaking the adhesion. Furthermore, this is accomplished without local wear upon the leather, as the disk is preferably full width of the leather facing and in the relative rotation of the clutch members will travel over all portions of the facing.

For convenience in manufacture the easements X are preferably in the form of circular disks which engage circular recesses X' milled or otherwise formed in the face of the member A. Clearance is preferably provided by coring out a portion of the face as indicated at $X^2$ and this restricts the length of the bearing segments upon opposite sides of the disks, which produces a favorable resilient action.

What I claim as my invention is:—

1. In a clutch, the combination with coöperating clutch members having an axial, slidable engagement with each other and means for yieldably engaging said members, of a torque transmission shaft having a universal, pivotal coupling engagement with one of said members and longitudinally adjustable, and means actuating said shaft to constitute the clutch-releasing means.

2. In a clutch, the combination with coöperating clutch members, of a spindle projecting from one of said members, a sleeve or hollow hub on the other of said members slidably engaging said spindle, a spring housed within said sleeve or hollow hub, a collar on said spindle forming an abutment for said spring, a shaft having a universal coupling with said sleeve, constituting a means for transmitting the torque, and a means actuating said shaft for releasing the clutch.

3. In a clutch, the combination with coöperating clutch members having an axial, slidable engagement with each other, of a torque transmission shaft universally, pivotally connected to one of said clutch members to provide for displacement from true alinement, an end thrust bearing on said shaft, and a clutch-releasing member having a lateral, slidable engagement with said end thrust bearing.

4. The combination with coöperating clutch members, of a shaft connected to one of said members longitudinally adjustable to release the clutch, a rod arranged parallel to said shaft, an arm projecting laterally from said rod engaging a bearing on said shaft, and a rock-arm engaging the end of said rod to actuate the same for releasing the clutch.

5. The combination with coöperating clutch members, of a shaft connected to one of said members, longitudinally adjustable to release the clutch, a resilient member for engaging said clutch members, a rod parallel to said shaft, slidable in a fixed bearing at one end, an actuating rock-arm engaging the opposite end of said rod, a laterally-projecting arm longitudinally-adjustably secured on said rod, and a thrust bearing on said shaft for engaging said laterally projecting arm.

6. In a clutch, the combination with coöperating clutch members, of a shaft connected to one of said members, longitudinally adjustable to release the clutch, resilient means for engaging the clutch, a rod arranged parallel to said shaft, an arm having a threaded engagement with said rod and projecting laterally into operative engagement with said shaft, means for locking said arm upon said threaded rod in different positions of adjustment, a fixed bearing in which one end of said rod is slidably secured, and a rock-arm recessed to engage the opposite end of said rod to actuate the same and said laterally-projecting arm.

7. In a clutch, the combination with coöperating clutch members, of a shaft coupled to one of said members longitudinally adjustable to release the clutch, a thrust bearing on said shaft formed of complementary segments laterally engageable with a flanged bearing on the shaft, a cupped housing or sleeve for engaging said segments to hold the same in engagement with said shaft, and an arm engaging an end of said cupped housing for actuating said shaft through the medium of said thrust bearing, said arm constituting a retainer for holding said housing from disengagement.

8. The combination with coöperating clutch members, of a hollow hub on one of said members, a spindle projecting from the other member, with which said hollow hub is slidably engaged, a spring housed within said hollow hub, an abutment secured to said spindle for the opposite end of said spring, a shaft in alinement with said spindle having a spherical head, a cap for said hollow hub provided with a spherical socket for engaging said spherical head, and an inter-locking engagement between said spherical head and socket permitting a limited universal, pivotal movement thereof.

9. The combination with coöperating clutch members, of a spindle upon the one and a hollow hub upon the other longitudinally slidable on said spindle, a spring housed within said hollow hub, an abutment secured to said spindle for the opposite end of said spring, a cap for said hollow hub having a spherical socket, a shaft having a spherical head engaging the socket of said cap, and inter-engaging teeth upon said spherical head and socket.

10. The combination with coöperating clutch members, of a spindle projecting axially from one member, a hollow hub upon the other member forming a housing surrounding said spindle and having a bearing at its inner end slidable thereon, a collar on the opposite end of said spindle longitudinally fixed thereon and slidably engaging said hollow hub, an anti-friction thrust bearing adjacent to said collar, a spring interposed between said thrust bearing and bearing at the inner end of said hub, a cap for said hollow hub having a spherical socket, and a shaft having a spherical head engaging said spherical socket and having a peripheral toothed engagement therewith.

11. The combination with coöperating clutch members, of a spindle projecting axially from one member, a hollow hub on the opposite member forming a housing surrounding said spindle and provided at its inner end with a bearing slidable thereon, a cap for said hollow hub, a bushing bridging the joint between said cap and hollow hub and having a shouldered engagement therewith, a collar on said spindle slidably engaging said bushing, an anti-friction thrust bearing adjacent to said collar, and a spring interposed between said anti-friction thrust bearing and the bearing at the inner end of said hub.

12. In a clutch, the combination with concentric inner and outer clutch members, of an easement between said members, comprising a resilient plate having a recessed seat in said outer clutch member and normally extending as a chord of an arc of the surface thereof.

13. In a clutch, the combination with inner and outer concentric clutch members having complementary circular friction surfaces, of an easement between said clutch members, comprising a resilient plate engaging a recessed seat in said outer clutch, normally extending as an arc of the friction surface thereof and being flexible to conform to the surface of the adjacent clutch member when the clutch is engaged.

14. In a clutch, the combination with coöperating inner and outer concentric clutch members, of an easement comprising a flat resilient plate seated in the outer clutch member, extending the full width of the friction face thereof and normally in a place which is a chord of an arc of the surface, said plate being bendable into conformity to the adjacent friction surface when the clutch is engaged.

15. The combination with coöperating inner and outer concentric, circular friction clutch members, of a round disk having a recessed seat in the outer clutch member and normally extending across said recess as a chord of the arc surface of said clutch member.

16. The combination with coöperating clutch members, of a spindle upon the one and a hollow hub upon the other, resilient means surrounding said spindle and inclosed within said hollow hub for normally holding said coöperating clutch members together, a cap for said hollow hub provided with an internally-toothed socket, and a shaft having a spherical portion engaging the socket of said cap, said spherical portion terminating in a complementary toothed flange.

In testimony whereof I affix my signature in presence of two witnesses.

ALANSON P. BRUSH.

Witnesses:
JAMES P. BANY,
ARTHUR D. PULVER.